July 30, 1935.  A. A. GOULD  2,009,445
WALL STRUCTURE WITH MOVABLE SECTION
Filed Sept. 21, 1931  4 Sheets-Sheet 1
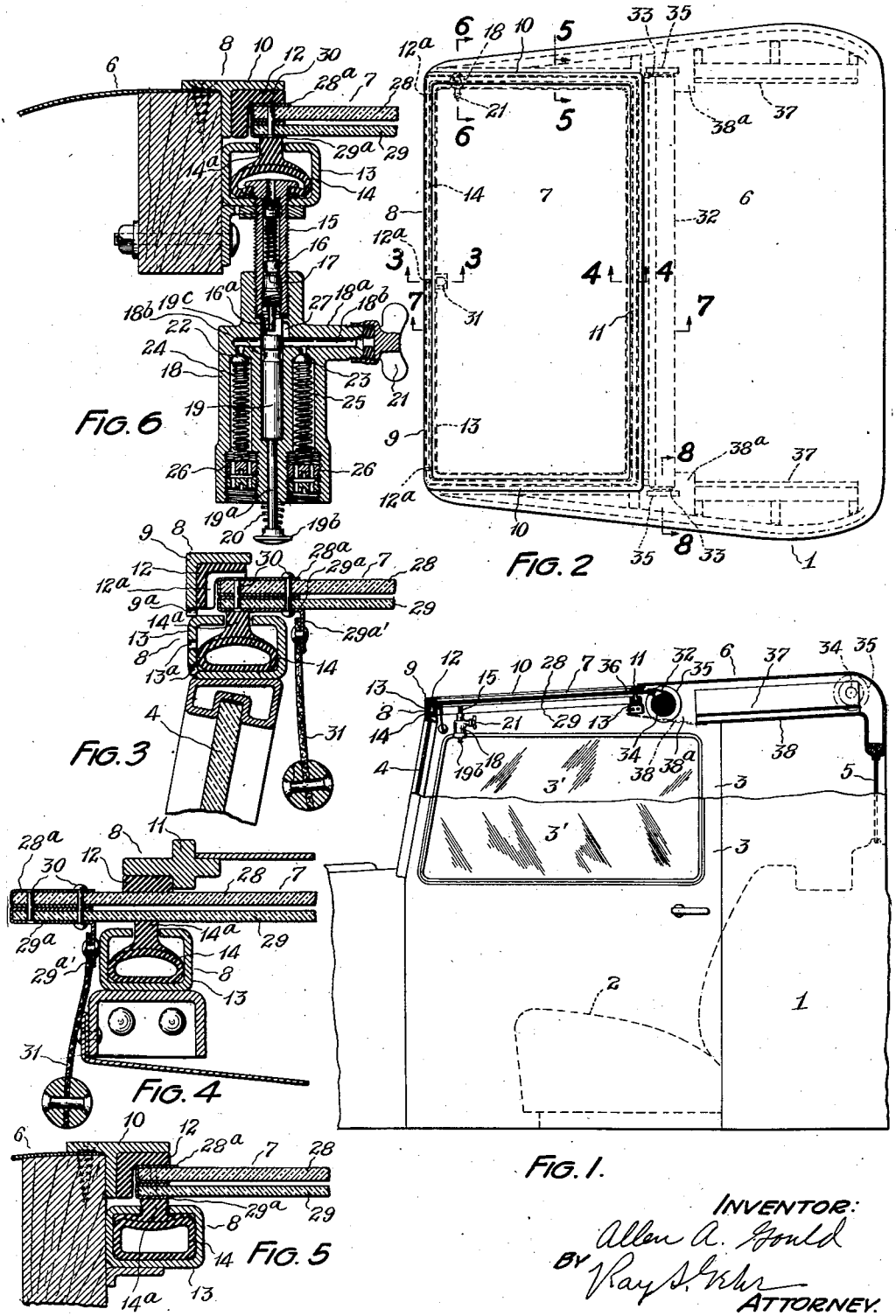
INVENTOR:
Allen A. Gould
BY
ATTORNEY.

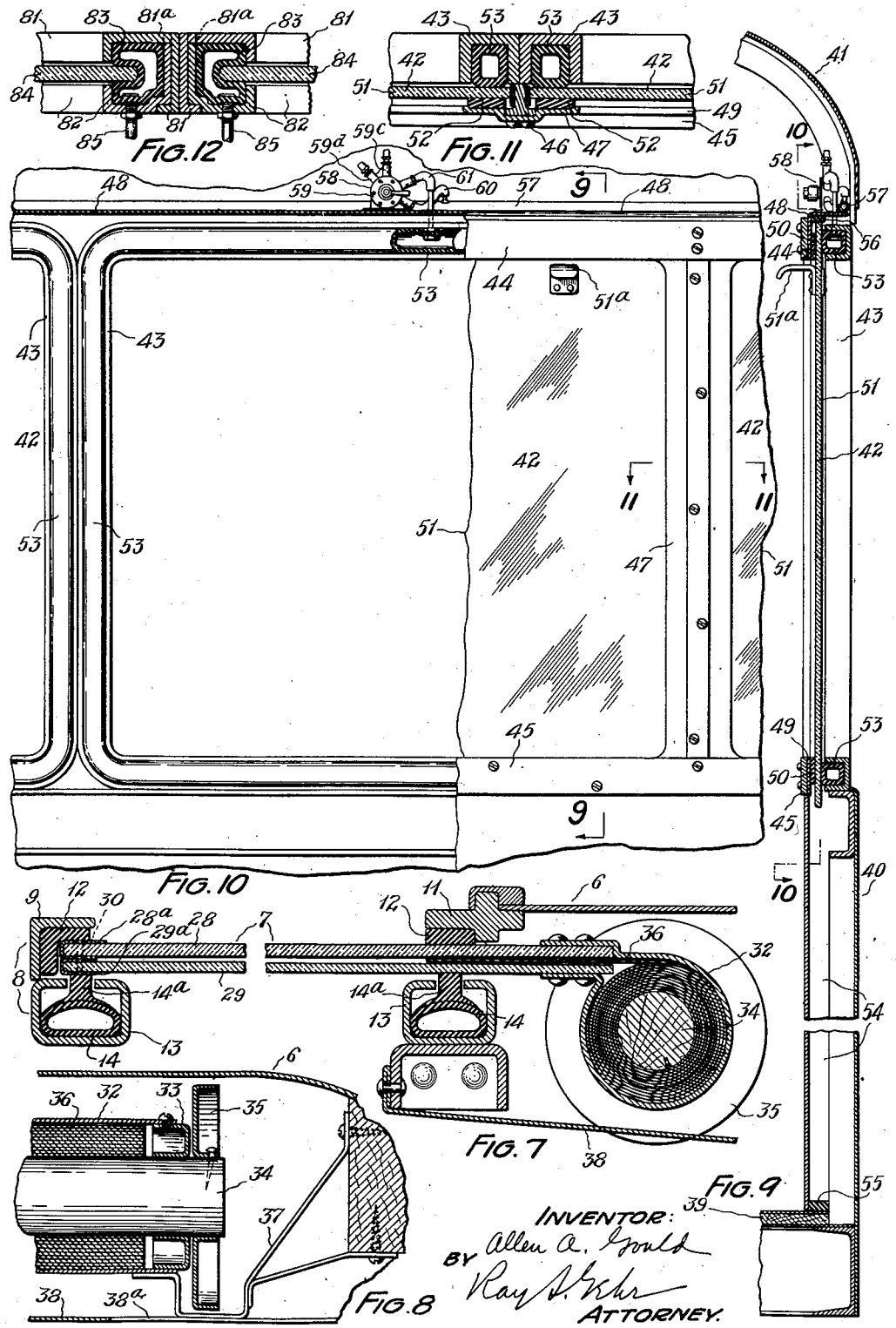
July 30, 1935.  A. A. GOULD  2,009,445
WALL STRUCTURE WITH MOVABLE SECTION
Filed Sept. 21, 1931   4 Sheets-Sheet 2

July 30, 1935.  A. A. GOULD  2,009,445
WALL STRUCTURE WITH MOVABLE SECTION
Filed Sept. 21, 1931   4 Sheets-Sheet 3

INVENTOR:
Allen A. Gould
BY
ATTORNEY.

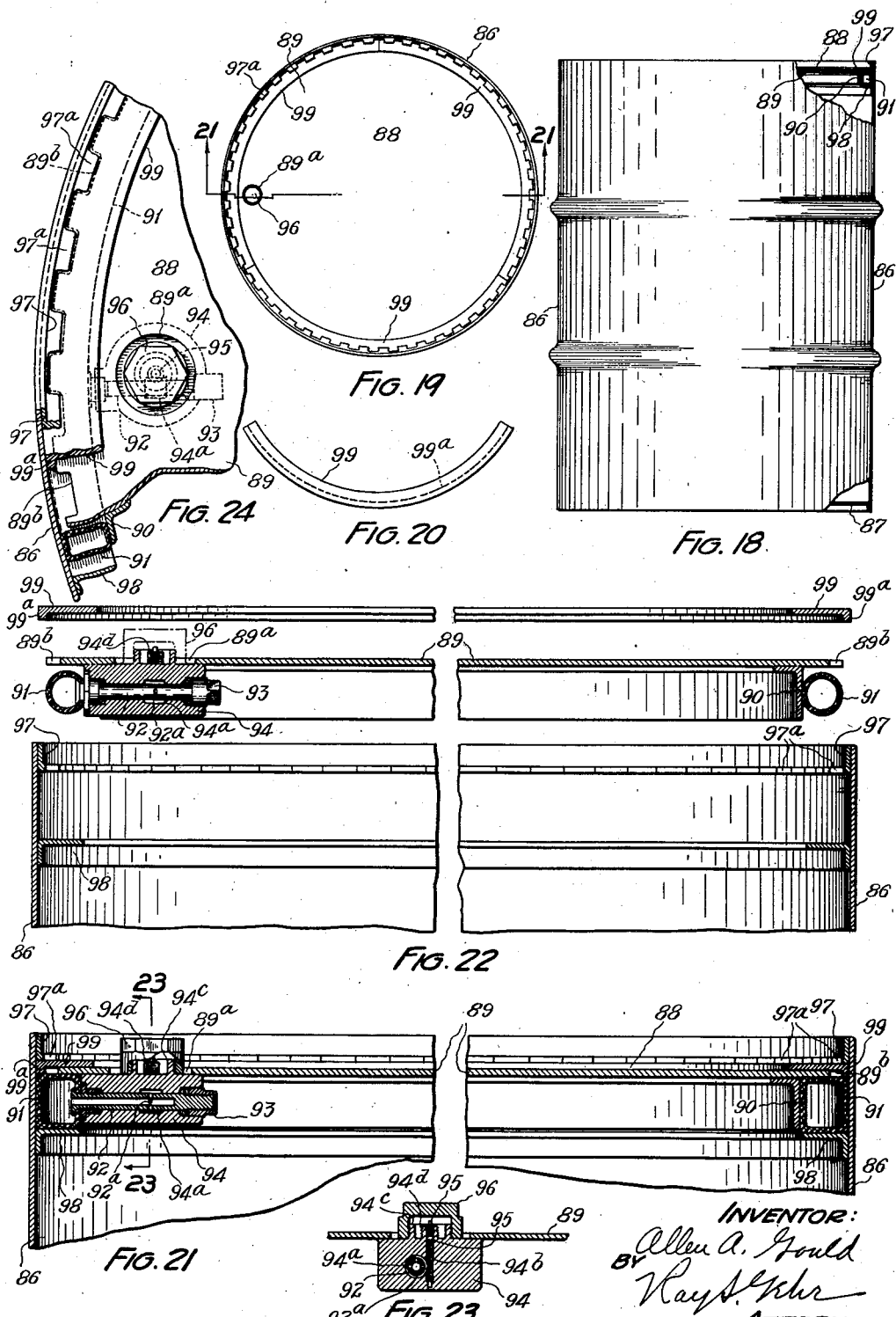

Patented July 30, 1935

2,009,445

UNITED STATES PATENT OFFICE 2,009,445

WALL STRUCTURE WITH MOVABLE SECTION

Allen A. Gould, Cleveland, Ohio

Application September 21, 1931, Serial No. 564,101

3 Claims. (Cl. 296—137)

The invention relates to an improved wall structure suitable for various applications in which the wall comprises a movable panel, section, or window, examples of contemplated applications of the invention being the window mountings of vehicles with closed bodies, and packing and shipping containers which have removable closures and are intended for repeated use.

One of the principal objects of the invention is the provision of a wall structure including a movable panel or section and having improved means forming, between the main and movable sections of the structure, a joint that is liquid tight, non-rattling, shock proof and adapted to readily release the movable section for movement or removal.

Another object of the invention is the provision of a wall structure of the character stated in the last preceding paragraph that is especially applicable to the mounting of movable windows of passenger vehicles.

A further object of the invention is the provision of a motor vehicle having a roof structure including a movable window with an improved weather tight joint of the character above noted.

Another object of the invention is the provision in a vehicle of the type having air brakes of a body having windows with pneumatic tubes forming joints between the windows and their frames, and connections to permit inflation of the tubes from the compressed air supply of the brake system of the vehicle.

Another object of the invention is the provision of a wall structure such as mentioned above in connection with the first object, which is especially applicable to shipping and storing containers such, for example, as steel casks or drums.

Still another object of the invention is the provision of a combined window and shade of new and improved construction and especially applicable to the windows of motor vehicles mounted in the manner above referred to.

Other objects of the invention more or less incidental or ancillary to the foregoing objects, as well as the preferred ways of carrying out all of the various objects, will be pointed out in the following description in connection with the accompanying drawings.

In the drawings Fig. 1 is a fragmentary side elevation of the body of a motor vehicle of the coupe type, with a portion of the upper part of the body shown in longitudinal vertical section.

Fig. 2 is a plan of the top of the motor vehicle body shown in Fig. 1.

Fig. 3 is an enlarged fragmentary section on the line 3—3 of Fig. 2, with the top window in forward position, the pneumatic tube being partially inflated.

Fig. 4 is a similar enlarged fragmentary section on the line 4—4 of Fig. 2, with the top window open.

Fig. 5 is an enlarged fragmentary section on the line 5—5 of Fig. 2, the pneumatic tube being fully inflated.

Fig. 6 is an enlarged fragmentary section on the line 6—6 of Fig. 2.

Fig. 7 is an enlarged section on the line 7—7 of Fig. 2 with a portion of the window structure broken away.

Fig. 8 is an enlarged fragmentary section on the line 8—8 of Fig. 2.

Fig. 9 is a fragmentary vertical transverse sectional view of one of the side walls of a motor bus body, having a window construction embodying my improvements.

Fig. 10 is an inside elevation of one of the windows of the last mentioned wall structure with some of the parts broken away to disclose the interior structural details.

Fig. 11 is an enlarged fragmentary section on the line 11—11 of Fig. 10.

Fig. 12 is a view similar to Fig. 11 illustrating a modified form of window mounting.

Fig. 18 is a side elevation of a steel cask or drum having a removable and replaceable closure and embodying my improvements, some of the parts of the drum being broken away to show the interior construction.

Fig. 19 is a top view of the drum shown in Fig. 18.

Fig. 20 is a plan view of one of the locking segments of the drum closure.

Fig. 21 is an enlarged fragmentary vertical section on the broken line 21—21 of Fig. 19, with a portion of the structure broken away to permit illustration on a large scale.

Fig. 22 is a view similar to Fig. 21 with the various parts of the drum closure detached from each other to further illustrate the details of construction.

Fig. 23 is a section on the line 23—23 of Fig. 21.

Fig. 24 is a fragmentary top plan view of the parts shown in Fig. 21.

Figures 15, 16, 17:
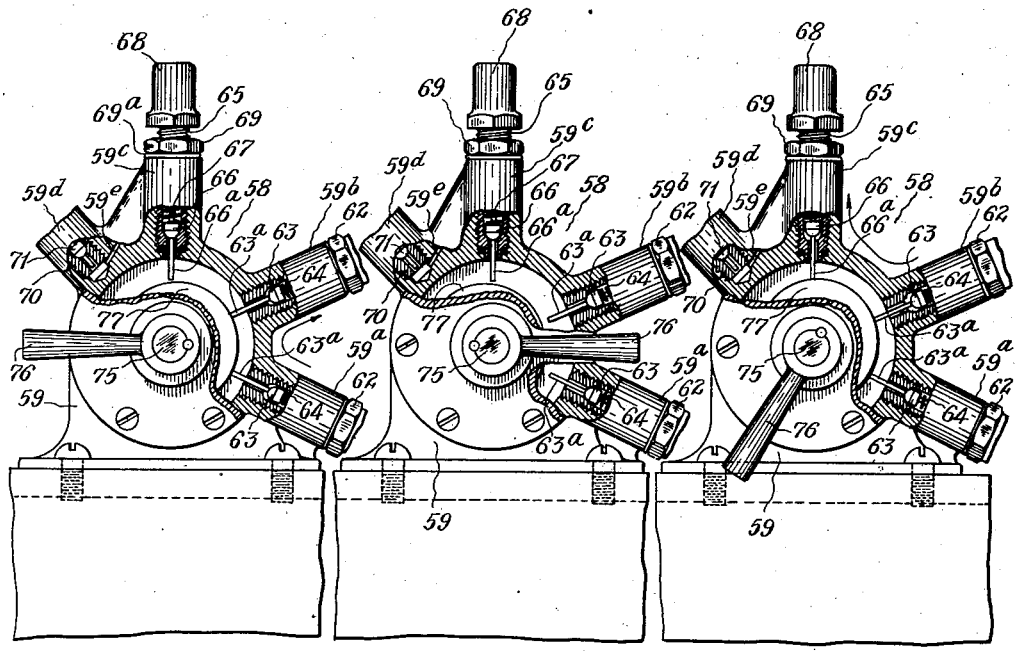
Figs. 15, 16 and 17 are side elevations, partly in section, of the same pneumatic valve device showing the parts in their different control positions.

Referring now in detail to the structures illustrated and first to the embodiment of the improvements shown in Figs. 1 to 8, inclusive, 1 represents in its entirety the body part of a motor car of the coupe type. The car has the usual transverse seat 2, opposite doors 3, 3 with windows 3', 3', front wind shield 4 and rear window 5. The roof or top of the vehicle body, which is designated in its entirety by 6, is of peculiar construction. The front part of the top or roof is formed with an opening which extends substantially the full width of the top and which is closed by a slidable glass panel or window which is designated in its entirety by 7. A rectangular frame, designated in its entirety by the numeral 8, is built into the roof structure and comprises an upper section having a front transverse member 9 of angle section (see Fig. 3), side members 10, 10 of T-section (see Fig. 5) and a rear transverse member 11 of cross-shaped section (see Fig. 4). A gasket or packing 12 of rubber or the like is secured to the under side of the said upper section of the frame 8 and affords a seat or abutment for the upper side of the glass panel or window pane 7, adjacent to the edges thereof. The window frame 8 further comprises a lower section in the form of a tube 13 which is substantially rectangular in cross section and which has its upper wall slotted as shown in Figs. 3, 4, 5 and 6. Within the tube or channel 13 is mounted a rubber pneumatic tube 14. The upper wall of this tube is formed with a heavy rib or shoe 14a which projects through the slot of the tube 13 in position to bear against the under side of the window glass 7 adjacent the edges thereof.

The pneumatic tube 14 is fitted with an inflation valve of the type commonly used with the tubes of pneumatic tires and which comprises a tubular body or casing 15, which extends downward through an aperture in the frame tube 13, and the usual removable valve 16 and seat 17, the valve 16 having a stem 16a which extends through the seat member 17 and projects from the end of the body 15. To the valve body 15 is screwed a valve casing 18 in which is mounted a plunger 19 having a stem 19a which projects from the lower end of the casing 18 and carries a handle 19b. A coil spring 20 is interposed between the casing and the handle 19b and serves to keep the plunger depressed. The casing 18 is formed with a lateral inflation branch 18a which is closed by a removable winged cap 21. The bore 18b of the inflation branch 18a extends across the bore in which is mounted the plunger 19 and the casing is further formed with parallel bores to accommodate a minimum pressure relief valve 22 and a maximum pressure relief valve 23, the bores of these two valves communicating with the transverse bore 18b as indicated in Fig. 6. The valves 22 and 23 are yieldingly pressed against their seats by the coil springs 24 and 25, respectively. The lower ends of the bores of these two valves open to the atmosphere through the adjustable abutment nuts 26, 26. The casing 18 is formed with a by-pass 27 which permits air entering the branch 18a to pass the upper end of the plunger 19 and flow through the valve body 15 into the pneumatic tube 14. Near its upper end the plunger 19 is formed with a circular channel 19c so that when the plunger 19 is lifted to engage the stem 16a of the valve 16 and open the latter air can flow from the pneumatic tube through the by-pass 27 and the channel 19c and gain access to the relief valve 22.

The window panel 7 insofar as some features of the invention are concerned, may be made of any suitable material, but I prefer to make it of glass. It may consist of a plain sheet or pane of glass but, in the preferred construction illustrated, I have combined with the panel a shade device. As shown the panel proper comprises two sheets of glass 28 and 29, the former superposed upon the latter with a narrow intervening space which is provided by the sheet metal frame channels 28a and 29a with which the front and side edges of the glass are protected and which are secured by rivets 30. The transverse front portion of the frame 29a is formed at the middle thereof with a depending tab 29a' to which is secured a strap 31 which can be grasped by the passenger to slide the window panel backward and forward.

To the rear, transverse edge of the window panel 7 is secured a cylindrical casing 32 (see Figs. 1 and 7) which is fitted at its two ends with bearing members 33 in which a roller 34 is rotatably mounted and hand wheels 35 are secured to the ends of the roller 34. To the roller 34 is attached one edge of a shade 36, the opposite free edge of which extends between the two sheets or panel of the window panel 7 (Fig. 7). The shade 36 is in the form of a flexible sheet of material having sufficient body and stiffness to permit it to be projected forward between the panes of the window panel 7 by rotation of the roller 34 in one direction as well as to be withdrawn therefrom and wound upon the roller when the latter is turned in the oppposite direction. The shade may, for example, be formed of a thin flexible fibre material, which would be entirely opaque, or it may be formed of a sheet of such material as pyroxylin which may be translucent or substantially opaque.

To guide and support the rear part of the panel 7 and the shade roll carried thereby, I mount fore and aft extending guides 37, 37 on the inner sides of the top structure of the car so that when the window panel 7 is drawn back the under side of the shade casing 32 can engage the guides 37 (as shown in Fig. 8) and find support thereon. The space into which the window panel 7 is drawn back is closed in by a sheet 38 of suitable fabric or other interior finish material, except for hand openings 38a, 38a at either side of the car adjacent the front ends of the guides 37. These openings or hand holes permit the driver or passenger to have access to the hand wheels 35 when the window panel is in closed position.

As the window panel 7 is below the level of the remainder of the top structure, I provide for the continuous drainage of water from the upper surface of the panel 7 when it is in closed position. From Fig. 1 it will be noted that the panel 7 slopes downward toward its front edge and to provide for the drainage of water over the said edge of the panel I form several channels 12a in that part of the gasket 12 engaging the front edge of the panel 7 and also form corresponding notches 9a in the transverse frame angle 9 (see Fig. 3). I also form drain apertures 13a in the transverse section of the tubular frame member 13 so that any water draining from the front edge of the panel 7 into the member 13 can find free outlet therefrom.

The use and operation of the slidable panel or window will readily be understood, it is believed, without extensive description. When it is desired that the top or roof of the vehicle be fully closed and weather tight, the panel 7 is drawn fully forward and the pneumatic tube 14 inflated to press the edges of the panel 7 upward against the rubber gasket 12. This may be accomplished simply by connecting a compressed air hose, such as commonly used for inflating tires, to the nozzle branch 18a of the valve casing 18. The compressed air flows through the by-pass 27 and past the valve 16 into the pneumatic tube 14 until the pressure in the latter reaches a predetermined maximum whereupon the relief valve 23 opens to prevent entrance of additional air into the tube 14. In case the valve 16 should stick on its seat, it can be freed by raising the plunger 19 into engagement with the valve stem 16a.

When it is desired to draw the window panel 7 back to a partially or fully open position, the driver or passenger lifts the plunger 19 to open the valve 16. When this is done, the annular channel 19c of the plunger 19 is brought into communication with the transverse bore 18b of the valve casing 18 so that air may flow out from the pneumatic tube 14 through the by-pass 27, channel 19c and thence past the relief valve 22 until the pressure in the tube 14 falls to a certain predetermined minimum which is such as to loosen the window panel 7 sufficiently to permit its movement but is still great enough to press the window panel lightly against the gasket 12 and prevent rattling. When the plunger 19 is in its lowermost position the upper end of the plunger cuts off that part of the bore 18b which communicates with the valve 22 from the by-pass 27 so that the low pressure relief valve 22 has no effect either during the inflation of the tube 14 or at any other time, unless the plunger 19 is raised.

The shade 36 can be adjusted to any desired position in the panel 7 by simply rotating one or the other of the hand wheels 35.

As is now well understood, a movable roof panel or window for automobiles has numerous advantages. If the panel is of glass, direct vision of the sky is permitted at all times whether the panel is open or closed. When the panel is open there is an effect more nearly approximating that of the open car than is possible with the conventional roof structure of the closed car. Furthermore, the roof window, by permitting a forward and upward vision, permits the driver to more easily see overhead traffic lights. In addition to these well understood advantages, my improved construction secures an exceedingly effective closure of the window panel that is weather tight, rattle proof, shock proof and that is susceptible of very easy manipulation. In addition, my improved combined window panel and shade construction provides the advantage of an effective and easily adjustable shade for cutting off sunlight or glare with a construction that is exceedingly compact, simple and readily operated.

In Figs. 9 to 17, inclusive, I have illustrated the application of my improved panel or window mounting to a passenger vehicle such as a highway motor bus or railway car. 39 designates generally the floor structure of the bus, 40 the side wall structure thereof and 41 the roof structure. The side wall is provided with a series of windows 42, 42, one of which, except for parts broken away, is shown in its entirety in Fig. 10. The rectangular frame of each window comprises an outer section 43 formed of channel bar with the open side of the channel facing toward the inside of the car, as indicated in Fig. 9. An inner section of the window frame is made up of top and bottom bars 44 and 45 of plain flat stock (Figs. 9 and 10), a vertical bar 46 of T-section (Fig. 11) and a vertical plate 47 which is recessed to receive the bar 46 and hold it in position. The vertical sides of the rectangular frames 43 abut against each other, as shown in Figs. 10 and 11 and, correspondingly, the vertical bars 46 and plates 47 serve adjacent windows in common. The top frame bar 44 carries a light-weight angle bar 48, one part of which projects above the top of the outer frame 43 of each of the windows. The lower frame bar 45 carries a corresponding flat plate 49.

On the faces of the members 48 and 49 are secured packing or gasket strips 50, 50 of rubber or the like to serve as abutments for the glass window pane 51. The vertical plates 47 are also fitted with rubber strips or gaskets 52, 52 for the same purpose. In the channel recess of each frame part 43 is disposed a rubber pneumatic tube 53 arranged to engage the outer side of the window pane 51 and press it against the gasket strips 50 and 52. When the pneumatic tube 53 is inflated with air at suitable pressure the window is yieldingly but firmly secured with a weather tight joint between the pneumatic tube and the window pane. By releasing air from the pneumatic tube the pressure thereof against the window can be reduced to permit a lowering of the window. The window pane is fitted with handles 51a, 51a to facilitate the raising and lowering thereof. When the window is lowered it is received within a chamber 54 formed in the lower portion of the side wall of the car. Rubber bumper or stop strips 55 are placed at the bottom of this chamber 54 to support the lower edge of the window pane 51 and to prevent breakage thereof in case it is lowered with too great force. Similarly, a bumper strip 56 is mounted on the angle member 48 to engage the upper edge of the window pane 51 when the latter is raised.

Motor busses and railway cars are commonly supplied with air brakes and I make use of the compressed air supply of the brake system of the vehicle for the inflation of the pneumatic tubes 53 of the windows. 57 designates a compressed air pipe extending above the tops of the windows and having communication with the compressed air tank (not shown) of the brake system of the bus or car. Above each window and on the frame thereof is mounted the manually operable valve device 58 for controlling admission of compressed air from the pipe 57 to the pneumatic tube 53 of the window and also for controlling the discharge of air from said pneumatic tube. The valve device 58 (see Fig. 13) comprises a casing 59 having an inlet branch 59a which is connected by a tube 60 with the air supply pipe 57, an outlet branch 59b, which is connected by a tube 61 with the pneumatic tube 53 of the window (see Fig. 10), and discharge branches 59c and 59d which are connected in series and through which the air is discharged to the atmosphere when its pressure rises above a predetermined maximum, or when it is desired to deflate the pneumatic tube.

Figures 13, 14:
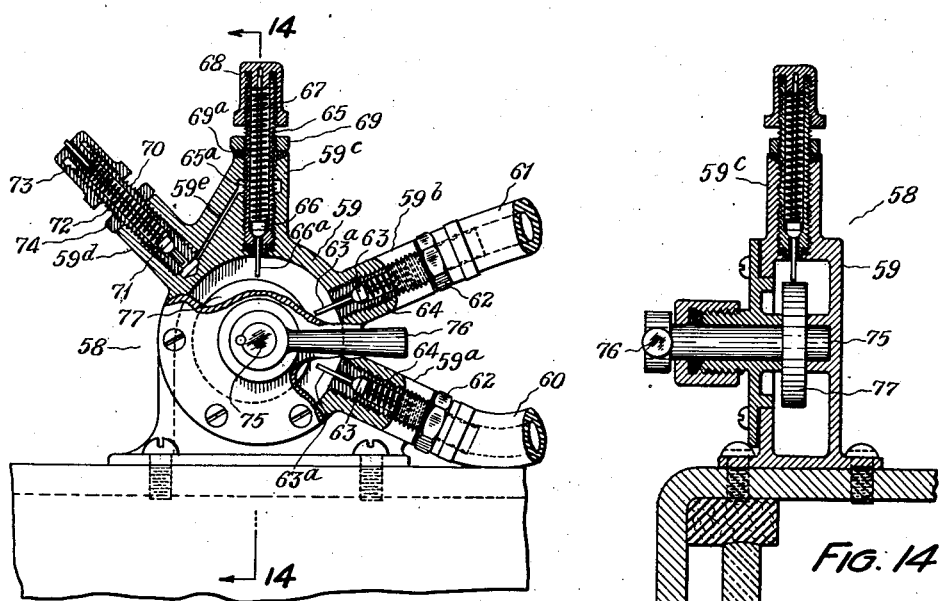
Fig. 13 is an enlarged side elevation of the manually operable pneumatic valve device shown in Figs. 9 and 10, with all of the individual valves shown in section.
Fig. 14 is a vertical section on the line 14—14 of Fig. 13.

Each of the casing branches 59a, 59b, is fitted with a valve device comprising a body or casing member 62, which is secured in the casing with an airtight joint, and which projects therefrom as shown in Fig. 13 to afford a connection with the tube 60 (or 61). In each of the casing members 62 is mounted an outwardly opening valve 63, which is yieldingly pressed to its seat in the casing member by a spring 64. The inner ends of the valve stems 63a project into the casing 59.

In the casing branch 59c is mounted a valve device comprising a body or casing member 65, and an outwardly opening valve 66, which is yieldingly pressed against its seat by a spring 67. The outer end of the member 65 is tightly closed by a threaded cap 68, which serves as an abutment for the outer end of the spring 67. The valve member 65 is secured in the casing by a nut 69 and packing 69a. As in the case of valves 63, the valve 66 has its stem 66a projecting into the casing 59. The valve casing member 65 is formed with an aperture 65a which communicates through a passage 59e in the main casing 59 with the inner end of the bore of the casing branch 59d, the inner end of this bore being closed. In the branch 59d is mounted a valve device comprising a casing or body 70, an outwardly opening valve 71 which is yieldingly pressed against its seat in the body 70 by a spring 72, the tension of which can be adjusted by the threaded cap 73, which is apertured to permit air passing the valve 71 to escape to the atmosphere. The valve member 70 is locked in the casing 59 by a nut 74. The spring 67 is designed to have a tension corresponding to the maximum air pressure which the pneumatic tube of the window is intended to sustain, while the spring 72 is designed to have a tension corresponding to the minimum pressure which it is desired to maintain in said pneumatic tube.

In the valve casing 59 is mounted a shaft 75 which is fitted on its outer end with an actuating handle 76 and, within the casing, carries a cam disc 77 which is designed to engage the inner ends of the valve stems 63a and 66a, in the manner indicated in the drawings.

In the use or operation of the window equipment last described, the window 42 is tightly secured in its closed position by moving the valve handle 76 to the position shown in Fig. 15. This opens the two valves 63 and permits compressed air to enter the pneumatic window tube 53 from the supply pipe 57. This causes inflation of the tube 53 and its pressure against the window pane affords a weather-tight joint and holds the window firmly in position, free from shock and rattle. In inflating the pneumatic tube 53, if the pressure of the air supplied is higher than that which it is desired to carry in the pneumatic tube, the valve spring 67 will yield when the predetermined maximum pressure is reached, permitting the valve 66 to open and air to pass through the passage 59e to the valve 71, which in turn is opened to permit escape of the compressed air to the atmosphere. The noise of this escaping air serves as a signal that the window tube is fully inflated, whereupon the valve handle 76 is turned in a counter-clockwise direction to the position shown in Fig. 16 with all of the individual control valves closed, thus holding the tube 53 in inflated condition. If it is desired to lower the window either partially or fully, the valve handle 76 is turned to the position shown in Fig. 17, which opens the valve in the casing branch 59b and that in the branch 59c, thus permitting air to escape from the pneumatic tube through the casing 59 and out past the valve 71 in the casing branch 59d, until the air pressure drops to the minimum value determined by the tension of the valve spring 72. This spring tension is adjusted to such a point that the air pressure in the window tube 53 is lowered sufficiently to permit the window 42 to be lowered or raised and at the same time is sufficient to secure it in adjusted position, though, if desired the tube 53 may be fully inflated again after the window has been moved to the desired position.

In Fig. 12 I have illustrated a modified form of the pneumatic tube joint for the window pane, the view in Fig. 12 being a horizontal section corresponding to that of Fig. 11. In this last form of construction the window frame is in the form of a substantially rectangular tubular structure made up of a member 81 which is completely rectangular in form and of four members 82 corresponding to the four sides of the rectangle and assembled in interlocking relation with the member 81, the member 81 being formed with a series of slots 81a to receive corresponding lugs formed on the members 82. Within the tubular frame thus formed is disposed a pneumatic tube 83 formed to embrace the edge of the glass pane 84 of the window. Each pneumatic tube is fitted with an air tube 85 corresponding to the tube 61 of the previously described construction, the tube 85, like the tube 61, being adapted to connect with the control valve 58.

In assembling the parts of the construction shown in Fig. 12, it will be understood, of course, that the pneumatic tube 83, deflated, is assembled in the frame section 81 and that the frame sections 82 are thereafter slipped into place. With the parts thus assembled, the pressure of the compressed air, when admitted to the pneumatic tube 83, serves to hold them in rigid interlocking relation.

The remainder of the window equipment used in conjunction with the form of construction shown in Fig. 12 being the same as that shown in Figs. 9 and 10, the operation of the window 84 is effected by manipulating the handle of the control valve 58 in the manner previously described.

In Figs. 18 to 24, inclusive, I have illustrated the application of my improved pneumatic joint to a steel drum with removable panel or closure, such drums being suitable for the packing, shipping and storing of various kinds of materials. The drum is of cylindrical form and comprises a side wall 86 and bottom 87 secured to the side wall with a hermetic joint in any well known manner. The top of the drum is fitted with a removable closure designated in its entirety by 88. The closure comprises a circular disc or plate 89 to which is riveted or welded a depending ring 90. A circular pneumatic tube 91 is secured to the closure and is fitted with an air inlet and discharge nipple 92 which is rigidly secured by a nut 93 in a block-like valve body 94 which is rigidly secured, as by welding, to the under side of the closure disc 89 adjacent to an aperture 89a thereof. The bore of the casing 94, in which the nipple 92 is fitted, is formed with an enlargement 94a which forms an annular chamber around the nipple 92 and the nipple is formed with one or more apertures 92a so that the interior of the nipple and consequently of the pneumatic tube 91 is in free communication with the annular chamber or passage 94a. The casing 94 is formed with a second bore 94b which intersects the annular chamber 94a and is adapted to receive the spring pressed valve 95 which is of the ordinary type with which the pneumatic tubes of tires are commonly fitted. The casing 94 is provided with a threaded nipple 94d to which the fitting of a compressed air tube can be attached for inflation of the pneumatic tube 91. The casing 94 also is formed with an upstanding annular flange 94c which is threaded to receive a closure nut 96.

The edge of the closure disc 89 is formed with a series of notches 89b, 89b which are adapted to permit the disc 89 to pass a locking ring 97 welded to the inner side of the side wall 86 of the drum adjacent the upper edge thereof. The ring 97 is formed with a series of inwardly projecting teeth 97a which are slightly smaller than the notches 89b so that the closure disc 89 can be lowered past the said teeth as stated. Below the ring 97 is an inwardly projecting ring 98 which is welded to the inner side wall of the drum. When the closure 89 with the pneumatic tube secured thereto is introduced into the end of the drum, the ring 98 serves as an abutment for the under side of the pneumatic tube. Three locking segments 99, 99 which, together, constitute an annulus, as shown in Fig. 19, serve to secure the closure 89 against outward displacement. These locking segments 99 are formed with downwardly extending flanges 99a at their outer edges which flanges are adapted to fit between the outer periphery of the closure 89 and the inner side wall of the drum. The segments 99 are assembled in locking position by moving them radially outward beneath the teeth of the ring 97 until the flanges 99a drop over the outer edges of the disc 89. The deflated pneumatic tube 91 permits the closure disc 89 to be pressed downward below the position shown in Fig. 21 sufficiently to permit this assembly of the locking segments 99.

When the parts of the drum have been assembled in the manner indicated the pneumatic tube can be inflated to a sufficient air pressure to lock the closure in place with a liquid and air tight seal. When it is desired to open the drum it is only necessary to remove the closure nut 96 and deflate the pneumatic tube 91 by depressing the valve 95, whereupon the closure 89 can be depressed sufficiently to disengage the locking segments 99 and permit withdrawal of the closure.

It will be seen that a steel drum with a closure of the character described is well adapted for the storing and shipping of various materials that must be tightly enclosed, and that it is adapted for indefinite use because of the ease with which the closure can be applied and removed.

From the diverse character of the applications of my improvements herein disclosed it is apparent that the said improvements may be applied to a very great variety of uses involving wall structures with removable panels or sections. It will, accordingly, be understood that I do not limit my invention to the particular structures disclosed except as indicated by the appended claims.

What I claim is:

1. In a wall structure, the combination of a wall section formed with an opening; a second relatively movable wall section adapted to close the said opening; means comprising an inflatable and deflatable pneumatic tube interposed between the two wall sections for securing the said sections together with the one closing the opening of the other; means comprising a valve for admitting compressed air into the tube; and means operable at will to effect discharge of air from the tube and acting automatically to stop such discharge when the pressure in the tube is lowered to a predetermined value.

2. In a wall structure, the combination of a wall section formed with an opening; a second relatively movable wall section adapted to close the said opening; means comprising an inflatable and deflatable pneumatic tube interposed between the two wall sections for securing the said sections together with the one closing the opening of the other; valve means for admitting compressed air into the tube and holding it therein; means for stopping the admission of the compressed air into the tube when the pressure therein attains a predetermined value; and means operable at will to effect discharge of air from the tube and acting automatically to stop said discharge when the pressure in the tube is lowered to a predetermined value.

3. In a vehicle having a body of the closed type, the combination of a roof structure formed with an opening; a movable panel adapted to close said opening and disposed with its front edge lower than its other edges; a gasket interposed between an undersurface of the roof structure and the upper surface of the panel, said gasket being adapted to form a liquid-tight joint between the roof structure and panel and one of the three parts being formed with a drain passage at the front edge of the panel adapted to conduct water from the top surface of the panel when it is closed; and means for pressing the panel against the gasket and controllable at will to vary the pressure upon the panel whereby the latter can be moved to uncover the roof opening.

ALLEN A. GOULD.